United States Patent Office 2,929,458
Patented Mar. 22, 1960

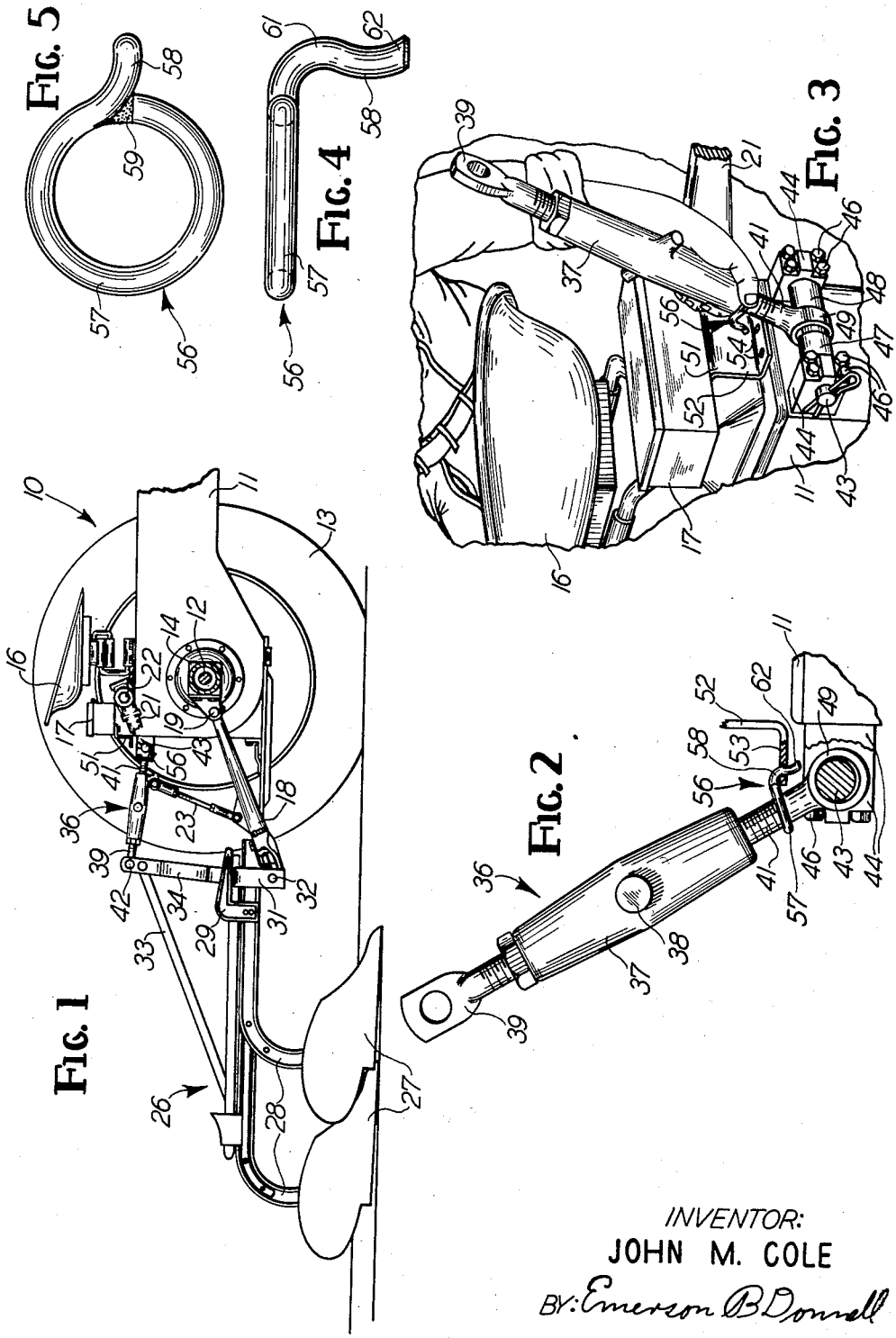

2,929,458

HOLDING DEVICE FOR NON-PIVOTALLY SECURING A PIVOTAL LINK TO A TRACTOR

John M. Cole, Davenport, Iowa, assignor to J. I. Case Company, Racine, Wis., a corporation of Wisconsin Application October 23, 1956, Serial No. 617,732

4 Claims. (Cl. 172—446)

This invention relates to a holding device for pivotally attached members, and it is particularly useful in securing the pivotally attached turnbuckle of a tractor in a non-pivotal or fixed position when the turnbuckle is not being used.

With reference to the specific employment of the means or device of this invention, it has always been a problem to secure the tractor turnbuckle, or third member of the three-point hitch for implements, to the tractor when the turnbuckle is not being used. In this regard, it should be understood that the tractor is commonly provided with three rearwardly extending members which are pivotal in vertical planes. The rearwardly extending free ends of these members can be attached to various implements, such as a plow. However, when the members are not being used, they should be secured out of the way and restrained from freely pivoting into contact with the tractor or other things. In the past, a chain was employed to anchor the third member of the three-point hitch, and one end of the chain was merely attached to the free end of the third member and the other end of the chain was attached to the tractor. This arrangement has obvious inconveniences and disadvantages.

It is an object of this invention to provide a holding device for securing the pivotal link of a tractor three-point hitch to the tractor in a non-pivotal position when the link is not in use.

A more specific object of this invention is to accomplish the foregoing object in a manner which permits simple and rapid attachment and detachment of said link to and from said tractor and so that the tractor operator can secure and release the link, in regard to its pivotal relation on the tractor, without obtaining other parts not already available and without moving off the seat of the tractor.

Still another object is to provide a retaining device for a pivotal link of a tractor three-point hitch wherein the device is inexpensive, readily and securely connected to the pivotal link, and is small and located to be out of the way when not in use.

A further object is to provide a tractor turnbuckle or link holding device which is not affected by horizontal adjustment of the turnbuckle or link, and, if a longitudinally extensible link, such as a turnbuckle, is used, the use of the device is not affected by longitudinal adjustment of the link.

Other objects and advantages will become apparent upon reading the following description in conjunction with the accompanying drawings, wherein:

Fig. 1 is a side elevational view of the rear end of a tractor with parts broken away and with a plow attached and showing a preferred embodiment of this invention.

Fig. 2 is an enlarged side elevational view of certain parts shown in Fig. 1 and with parts sectioned and broken away and in a different position.

Fig. 3 is a rear perspective view of a fragment of Fig. 1 with parts broken away.

Fig. 4 is an enlarged side elevational view of a part shown in the previous drawings.

Fig. 5 is a top plan view of Fig. 4.

The same reference numerals refer to the same parts throughout the views.

Fig. 1 shows the rear end of a tractor 10 including the chassis 11, the rear axle 12, and a rear wheel 13. The usual rear axle housing 14, seat 16, and tool box 17 are also shown in the drawing and are all suitably and conventionally attached to the tractor. Also, the usual hitch or draft arms or links 18 are pivotally attached at 19 to the rear axle housing, and extend rearwardly of the tractor; and the usual lift arms 21 are pivotally attached to the tractor at the power shaft 22. The arms 19 and 21 are connected through the usual adjustable link 23, and the arm 21 is broken away to facilitate showing the parts directly behind it.

A conventional plow 26 is shown attached to the tractor 10 and it includes the plow bottoms 27 and the beam 28 and the angled bracket 29. The latter is spaced above the beams 28 so that the usual horizontally dsiposed bar 31, with the usual depending ends, can be received in the space therebetween. Of course the bar 31 is attached to the plow in any well-known manner, and the rear ends of the hitch arms 18 are attached at 32 to the depending ends of the bar 31. The plow also includes the usual mast members 33 and 34 which are secured to the plow at their lower ends.

The usual turnbuckle or third link member 36 of the tractor three-point hitch is also attachable to the plow and to the tractor to support the implement on the tractor. The turnbuckle consists of the housing 37 having the lugs 38 projecting therefrom and the usual eyelet bolts 39 and 41 at opposite ends of the housing. The bolt 39 is threadedly attached to the rearward end of the housing 37 and attaches to the plow mast at the pin 42. It is when the link 36 is not attached to the plow or any other implement that it is important to secure the link in a rigid non-pivotal position on the tractor, as described later. Of course the bolt 41 is also threadedly attached to the housing 37, and it can be removed from the housing by unscrewing it. Further, the length of the turnbuckle can be adjusted by the well-known method of rotating the housing 37 by gripping the lugs 38 and, for this reason, the threads on the shanks of the bolts 39 and 41 are commonly disposed in opposite directions of left and right hand orientation.

Figs. 2 and 3 show that the turnbuckle bolt 41 is pivotally attached to the tractor on a shaft or bar 43 which is imbedded at opposite ends in mounting blocks 44 which are secured to the tractor by bolts 46. The shaft 43 is thus suitably attached to the rear of the tractor to be horizontally disposed and provide the pivotal mounting for the turnbuckle since the eyelet bolt 41 receives the shaft 43. It should also be noted that collars or spacers 47 and 48 are mounted on the shaft 43 to axially locate the link 36 on the shaft 43 as the circular end 49 of the bolt 41 encircles the shaft 43 and is flanked by the collars 47 and 48. The shaft 43 is removable from the blocks 44 and thus the spacers 47 and 48 and the eye bolt 41 can be rearranged on the shaft 43 to locate the bolt 41 at either end of the shaft 43 instead of centrally thereon as shown in the drawings. In this manner, the link 36 can be located to one side or the other for alignment with an off-center mast of a trailing implement. In all positions of the link 36, the latter is pivotal on the tractor, and the free end, which is the end where bolt 39 is located, is free to pivot without restriction when the link is not being used in attaching to an implement mast. If the link were allowed to pivot downwardly, the lower end would interfere with the tractor power take-off shaft, the tractor drawbar, and other parts, and the hanging link would likely be damaged by the normal bouncing of the tractor in use.

The important feature of the entire construction is the hereinafter described holding device which secures the third member 36 in a non-pivotal position shown in Fig. 2. The device includes a plate or receiver 51 which is suitably attached to the tool box 17 and depends therefrom in a vertical portion 52 and a horizontal portion 53. The latter portion is provided with a plurality of holes or recesses 54, as shown in Fig. 3, and each hole 54 is in alignment with one of the positions of the link 36 axially on the shaft 43. Of course, the receiver 51 could have a shape different from that shown and it could be attached to the tractor in a different manner other than being attached to the tool box. The holding device also includes a hook 56 which consists of an annular end or ring 57 and an extended hook end 58. The latter is reversely curved for a reason mentioned later.

The annular end 57 of the hook 56 is welded together at 59, as shown in Fig. 5, and the internal diameter of the ring is preferably slightly larger than the diameter of the shank of the bolt 41 about which the ring is disposed. It is preferred that the hook be formed and welded together and then disposed on the bolt 41 before the latter is threaded into the housing 37. In this manner, the ring is free to move axially and to rotate on the bolt 41, and, as indicated in Fig. 3, the operator can easily move the hook 56 along the link 36 with one hand, and he can simultaneously support the link 36 with the same hand.

It will be noted that the hook end 58 includes a first curved portion 61 and a second curved portion 62 with the two curves being opposite from each other and in the particular directions shown with respect to the ring 57. As shown in Fig. 2, the hook end 58 fits into the holes 54 when all the parts are positioned, as shown. In this position, the link 36 is retained in a non-pivotal position out of the way of other parts on the tractor. The weight of the link 36 exerts a rearward and downward force on the hook 56 and the hook end portion 62 holds the hook to the plate 51 since the portion 62 is curved away from the direction of the force on the hook. If the link 36 is vibrated or bounced when it is in the Fig. 2 position, the hook 56 will not be released from the plate 51 since the hook will tend to rotate counter-clockwise in Fig. 2 and the portion 62 will only become more firmly seated in the hole 54. The hook can be released from the plate 51 only if the link 36 is pivoted forwardly until the hook 56 can be pivoted about the hole 54 to where the portion 62 will pass through the hole when the link is lifted up. The conditions for releasing the hook are not achieved in the normal bouncing caused by use of the tractor, but rather the specific steps of the releasing procedure must be performed by the operator, and they can be performed as indicated in Fig. 3.

While a specific embodiment of this invention has been shown and described, it should be understood that certain changes could be made without deviating from the scope of this invention which should, therefore, be limited only by the appended claims.

What is claimed is:

1. A device for releasably retaining the pivotal third member of a three-point hitch of a tractor in a non-pivotal position about its axis of pivot on said tractor, comprising a ring portion loosely receiving the lower end of said third member to be movably attached to said third member, a second portion attached to said ring portion and extending therefrom in a reversely curved free end disposed below the plane of said ring portion and with the curve thereof directed away from said ring portion, a receiver attached to said tractor and having a recess disposed above said axis of pivot for receiving said free end of said second portion, said axis of pivot and said device being related to non-pivotally retain said third member in a rearwardly and upwardly directed position with respect to said tractor.

2. A device for releasably retaining the pivotal third link of a three-point hitch of a tractor in a non-pivotal position on said tractor, comprising a shaft attached to the rear end of said tractor and horizontally disposed transverse to the fore-and-aft axis of said tractor and pivotally supporting said link and being of a length for movement of said link therealong to selected positions on said shaft, a hook movably attached to said link and including a ring portion and a hook end, said ring portion being loosely disposed around said link adjacent said pivot shaft thereof and said hook end extending from said ring portion and terminating in a terminal end curved away from said ring portion, and a hook receiver attached to said tractor and being co-extensive with said shaft and having hole means disposed above said pivot shaft for receiving said hook end in said selected positions of said link.

3. A device for releasably retaining the pivotal third link of a three-point hitch of a tractor in a non-pivotal position on said tractor, comprising a pivot shaft attached to the rear end of said tractor and horizontally disposed transverse to the fore-and-aft axis of said tractor, an implement supporting link pivotally mounted on said shaft for pivotal movement in vertical planes parallel to said fore-and-aft axis of said tractor and movable along the axis of said shaft for selective positioning transverse to said fore-and-aft axis of said tractor, spacers adjustably mounted on said shaft for selective positioning thereon to restrict axial movement of said link on said shaft, a hook movably attached at one end to said link and extending therefrom in a hook end, and a receiver attached to said tractor and having a plurality of recesses therein disposed in front of each selective position of said link on said shaft for receiving said hook end to retain said link in a non-pivotal position on said tractor when said link is pivoted forwardly on said tractor and is not being used for supporting an implement.

4. In a device for releasably retaining a pivotal link on the rear end of a tractor in a non-pivotal position, the combination comprising a shaft horizontally mounted on the rear end of said tractor and disposed in a lateral direction with respect to said tractor, a link pivotally mounted on said shaft for pivotal movement in the fore-and-aft plane of said tractor, a ring loosely encircling said link at the end thereof above said shaft for axial and rotatable movement on said link, a hook end attached to and extending downwardly from said ring and terminating in an end portion disposed in a plane transverse to the plane of said ring and with the free end of said end portion being curved away from the axis of said ring, and a receiver attached to said rear end of said tractor and disposed in a horizontal portion at a level above said shaft, said horizontal portion of said receiver having a hole for receiving said hook end when said link is pivoted toward said tractor, and said hole being of a size to fit said hook end closely enough to necessitate swinging of said device in the plane of said hook end for removal thereof from said hole.

References Cited in the file of this patent

UNITED STATES PATENTS

| 2,596,629 | Ward | May 13, 1952 |
| 2,710,569 | Altgelt | June 14, 1955 |
| 2,740,214 | Collins | Apr. 3, 1956 |

FOREIGN PATENTS

| 1,124,909 | France | July 9, 1956 |

OTHER REFERENCES

Publication: "Pick Up-and-Go" Farming with the John Deere Models 50, 60 and 70 tractors (only pages 4 and 5 required) brochure (received in Patent Office December 17, 1953).